United States Patent [19]

Hosoya

[11] Patent Number: 4,477,831
[45] Date of Patent: Oct. 16, 1984

[54] COLOR GAIN CONTROL CIRCUIT

[75] Inventor: Nobukazu Hosoya, Nara, Japan

[73] Assignee: Sanyo Electric Co., Ltd., Osaka, Japan

[21] Appl. No.: 380,723

[22] PCT Filed: Sep. 10, 1981

[86] PCT No.: PCT/JP81/00229
§ 371 Date: May 10, 1982
§ 102(e) Date: May 10, 1982

[87] PCT Pub. No.: WO82/01110
PCT Pub. Date: Apr. 1, 1982

[30] Foreign Application Priority Data

Sep. 11, 1980 [JP] Japan .................. 55-127581

[51] Int. Cl.³ .............. H04N 9/535; H04N 9/49
[52] U.S. Cl. ............................. 358/27; 358/26
[58] Field of Search ............ 358/27 F, 27, 26 F, 358/26

[56] References Cited

U.S. PATENT DOCUMENTS 4,054,905 10/1977 Harwood et al. .............. 358/27

FOREIGN PATENT DOCUMENTS 44-5770 3/1969 Japan .
47-2810 7/1972 Japan .
52-40947 3/1977 Japan .
53-54922 5/1978 Japan .

Primary Examiner—John C. Martin
Assistant Examiner—Victor R. Kostak
Attorney, Agent, or Firm—Armstrong, Nikaido, Marmelstein & Kubovcik

[57] ABSTRACT

A color gain control circuit for use in a color television receiver set comprises manual and automatic gain controls which are connected in cascade fashion between a power source and a reference potential. The automatic gain control is positioned upstream of the manual gain control. By connecting the manual and automatic gain controls in cascade fashion as described above, these controls can be integrated together and the color gain control circuit can be simplified in its circuit construction, enabling the color amplification system to be integrated.

4 Claims, 9 Drawing Figures

4,477,831

COLOR GAIN CONTROL CIRCUIT

FIELD OF TECHNOLOGY

The present invention relates to a color gain control circuit for use in a color television receiver set, etc., and, more particularly, to a color gain control circuit of unitary structure wherein manual and automatic gain controls are connected in cascade fashion.

BACKGROUND ART

In general, in a color television receiver set, a color amplification system for amplifying a color signal comprising a carrier color signal and a color burst signal is provided with a color gain control circuit comprising a manual gain control wherein the color gain can be adjusted by a manipulatable voltage, and an automatic gain control wherein the color gain can be automatically adjusted by an ACC (automatic color control) signal.

However, in the conventional color gain control circuit, the manual and automatic gain controls are separately provided and, therefore, not only is the cost high with the increased number of component parts used in the color amplification system, but also a relatively large space is required for installation of the color gain control circuit when the color amplification system is fabricated into an integrated circuit (IC).

The present invention has been developed with a view to eliminate the above described disadvantages and has for its first object to provide a novel color gain control circuit wherein the manual and automatic gain controls are integrated by connecting them together in cascade fashion and which can, therefore, be easily fabricated into an integrated circuit with the reduced number of the component parts.

A second object of the present invention is to provide a color gain control circuit wherein the manual gain control is constituted completely by a differential circuit construction so that transistors forming each differential pair can be in a thermally balanced condition to minimize change in gain of the manual gain control relative to temperature.

A third object of the present invention is to provide a color gain control circuit wherein the ACC signal for the automatic gain control is constituted by an output from a comparator for comparing the respective amplitudes of output from a B-Y demodulator and an R-Y demodulator or a G-Y demodulator so that noises superimposed respectively on the outputs from the B-Y demodulator and the R-Y demodulator or G-Y demodulator in the comparator are counterbalanced to each other to avoid any possible reduction in S/N ratio of the ACC signal even when in a weak electrical field.

A fourth object of the present invention is to provide a color gain control circuit for a color television receiver set having a color killer system so designed as to avoid the appearance of color noises on a picture screen which would result from the stoppage of the manual gain control during the condition in which color synchronism is out of order at the time of receipt a color television broadcasting, in which color gain control circuit there is provided a killer disabling means for disabling a color killer signal in response to a pulse of a width including a color burst signal period and slightly larger than the color burst period so that, during at least the color burst period, the manual gain control can be operable to supply a color burst to a phase comparator in an automatic color synchronizing circuit.

DISCLOSURE OF THE INVENTION

To accomplish these objects, in the present invention, the color gain control circuit comprises a cascade-connected arrangement of a manual gain control so designed as to enable the bias to be adjustable by a manipulatable voltage between an electrical power source and a reference potential, and an automatic gain control so designed as to enable the bias to be automatically adjusted by an ACC signal, said automatic gain control being positioned upstream of the manual gain control.

As stated above, by connecting the manual and automatic gain controls in cascade fashion between the power source and the reference potential, these manual and automatic gain controls can be integrated together and, therefore, not only can the color gain control be fabricated in a simple construction, but also the color amplification system can easily be fabricated into an integrated circuit.

Moreover, by positioning the automatic gain control upstream of the manual gain control, the latitude can be increased of the bias of the automatic and manual gain control and a constant current source for supplying a constant current to these circuits.

In one preferred embodiment of the present invention, the manual gain control comprises a first differential pair of differentially connected transistors and a second differential pair of differentially connected transistors connected together to the same constant current source, and a resistor inserted between the second differential pair and the constant current source, output terminals of said respective first and second differential pairs being connected to each other.

The second differential pair is so designed as to enable the bias to be adjusted by the manipulatable voltage to vary the direct current flowing through the first differential pair whereby the gain of the first differential pair can be varied.

Since the first and second differential pairs constitute a differential circuit arrangement sharing the same constant current source, the amounts of change relative to the temperature of the currents flowing through the transistors forming the first and second differential pairs can be equalized to each other, whereby the thermal characteristic of the gain of the manual gain control can be improved.

Moreover, in a preferred embodiment of the present invention, the ACC signal for the automatic gain control is obtained from a comparator for comparing the amplitude of the ACC signal with the amplitudes of outputs from a B-Y demodulator and an R-Y demodulator or a G-Y demodulator.

As described above, if a signal obtained by amplitude-comparing the outputs from the B-Y and G-Y demodulators is used as the ACC signal, noises superimposed on the outputs from the B-Y and R-Y or G-Y demodulators can be counterbalanced to each other during the amplitude comparison and, therefore, there is no possibility of the S/N ratio of the ACC signal being reduced even when in a weak electrical field.

Furthermore, in another preferred embodiment of the present invention, there is employed a killer disabling means for disabling the color killer signal during at least the color burst period to make the manual gain control work.

With the provision of the killer disabling means, the color burst signal can be given to a phase shifter in the automatic color synchronizing circuit to effect color synchronization.

BEST MODE FOR CARRYING OUT THE INVENTION

For the illustration of the present invention in detail, the present invention will be specifically described with reference to the accompanying drawings.

Figure 1:
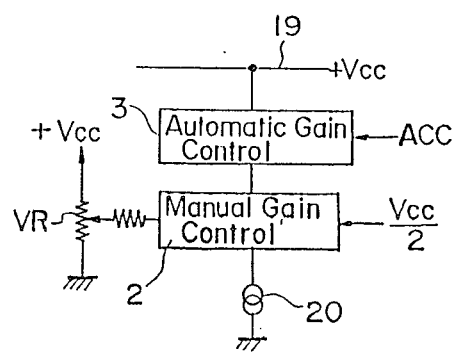
FIG. 1 is a block diagram of a color gain control circuit according to the present invention.

As shown in FIG. 1, in the present invention, a feature resides in that a manual gain control 2, the bias of which is variable by a voltage VR, and an automatic gain control 3, the bias of which is automatically variable by an ACC signal, are cascade-connected to each other between a power line 19 connected to a source (+Vcc) of voltage and the earth with the automatic gain control 3 positioned upstream of the manual gain control 2.

In FIG. 1, 20 represents a constant current source means.

By cascade-connecting the manual and automatic gain controls 2 and 3 in this way, these two circuits can be integrated together and, therefore, the color gain control circuit can be very simplified in its circuit construction.

Figure 2:
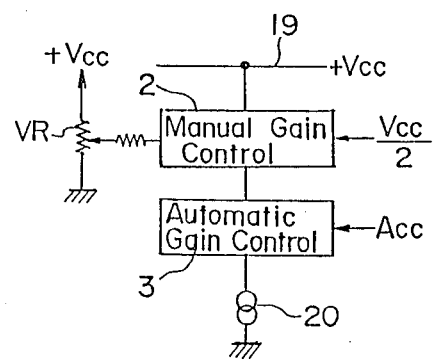
FIG. 2 is an explanatory diagram for the explanation of the bias latitude applicable where an automatic gain control is positioned downstream of a manual gain control.

The reason for the positioning of the automatic gain control 3 upstream of the manual gain control 2 is for increasing the bias latitude of each of the manual gain control 2, the automatic gain control 3 and the constant current source means 20.

Where the automatic gain control 3 is positioned downstream of the manual gain control 2 as shown in FIG. 2 in a manner reverse to that described above, the control point of the voltage VR is usually ½ Vcc and, therefore, the bias of each of the automatic gain control 3 and the constant current source means 20 has to be set at a value lower than ½ Vcc and it is because the ACC operation results in a difficulty.

By way of example, the lower the voltage of the source in the case of an integrated circuit, the higher the current amplification factor $\beta$ of the transistors, and, therefore, the voltage of the source is generally selected to be of a low value. However, if the source voltage +Vcc is assumed to be +12 volts, the central point of the voltage VR gives +6 volts, thus giving an extremely low value.

Before the description of the color gain control circuit of the present invention proceeds, the position of the color gain control circuit in a color signal processing circuit will be described with reference to FIG. 3.

Figure 3:
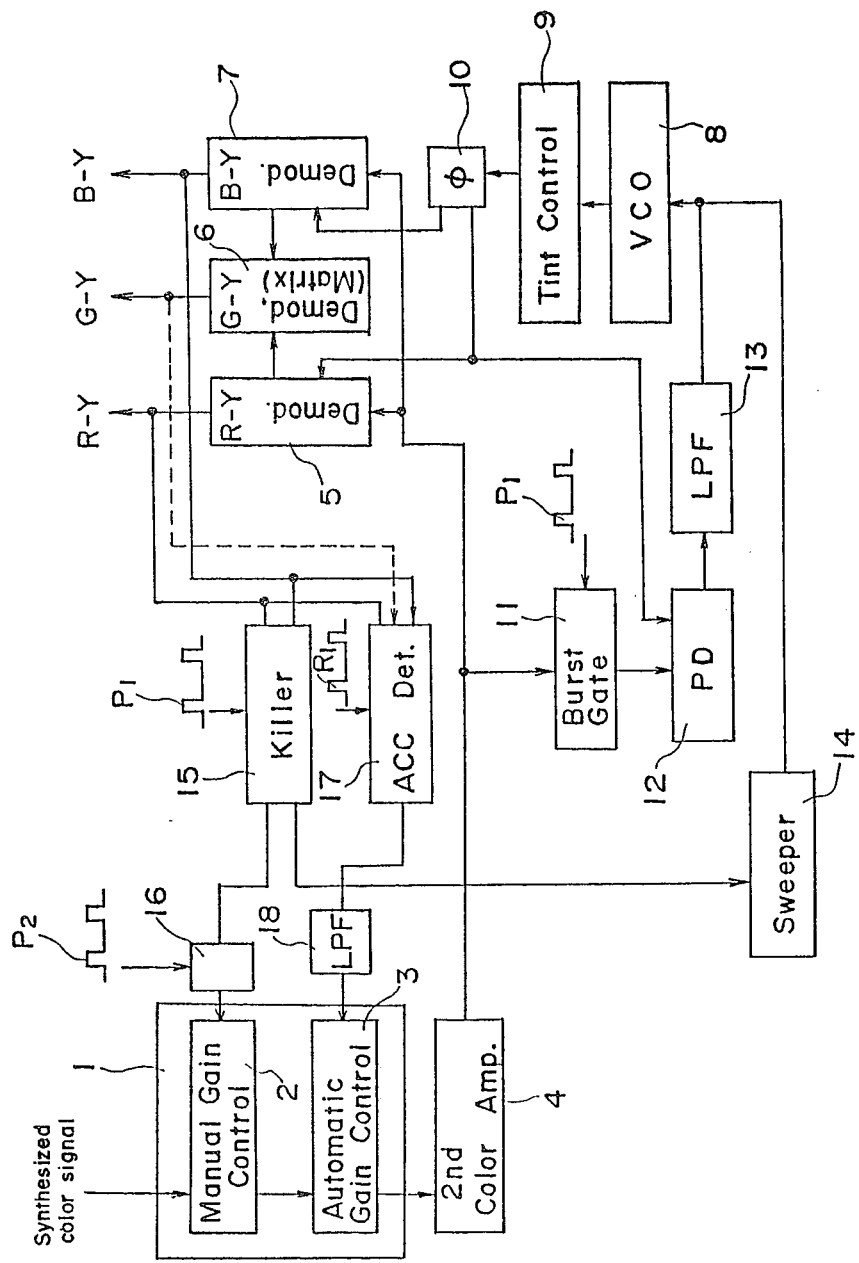
FIG. 3 is a block diagram showing the color gain control circuit of the invention together with its peripheral circuits.

Referring to FIG. 3, 1 represents a first color amplifier for amplifying a synthesized color signal applied thereto through a bandpass circuit and includes a unitary structure of the above described manual and automatic gain controls 2 and 3. 4 represents a second color amplifier. 17 represents an ACC detector adapted to receive outputs from a B-Y demodulator 7 and an R-Y demodulator 5 and to synthesize an ACC signal, the output from which is applied to the automatic gain control 3 through a low pass filter 18. This ACC detector 17 performs a detecting operation only during the duration of a burst gating pulse $P_1$ and does not operate during a period other than that and, therefore, only one of the outputs respectively from the B-Y and R-Y demodulators 7 and 5 which falls within the color burst signal period is utilized.

This equally applies to a color killer circuit 15 driven by the burst gating pulse $P_1$.

It is to be noted that, as an input signal for the detection of the ACC signal, the output from the G-Y demodulator 6 may be used in place of the output from the R-Y demodulator 5.

An output from the color killer 15 is supplied to both the manual gain control 2 and a sweeper 14 as will be described later, whereas the color killer output to be fed to the manual gain control 2 is cared not to be interrupted during the color burst signal period by a killer disabling means 16 even in a condition in which 2 ought to be stopped. The killer disabling 16 is activated by a pulse $P_2$ of a pulse width including the color burst signal period.

8 is a voltage-controlled oscillator for generating a color subcarrier, the output of which is applied to both of the R-Y and B-Y demodulators 5 and 7 and a phase comparator 12 through a tint control 9 and a phase shifter 10. The phase comparator 12 is operable to compare the phase of the color burst signal, separated from the output of the color amplifier 4 in a burst gate 11, with the phase of the color subcarrier, the output of which is utilized to control the frequency and phase of the voltage-controlled oscillator 8. 13 represents a low pass filter for removing both noises and a high frequency component from a control voltage.

The sweeper 14 is adapted to generate a stepwise sweep voltage to be superimposed on the output from the phase comparator 12 so as to eliminate such a disadvantage that, when the amplitude of the output from the phase comparator 12 is low, no lock is effected to a stabilized potential of 3.579545 MHz.

The color killer 15 serves to stop the manual gain control 2 during the receipt of a black-and-white television broadcasting to avoid the supply of the color signal to the subsequent circuit stages, but also serves to stop the manual gain control 2, in the event that synchronization becomes out of order even during the receipt of a color television broadcasting, to avoid the appearance of color noises on a picture screen and to operate the sweeper 14.

However, the color killer 15 causes the killer disabling means to operate the manual gain control 2 during the color burst signal period.

That is, during the normal receipt of the color broadcasting, the color killer 15 operates in such a way as to cause the manual gain control 2 to operate, but to stop the operation of the sweeper 14.

Figure 4:
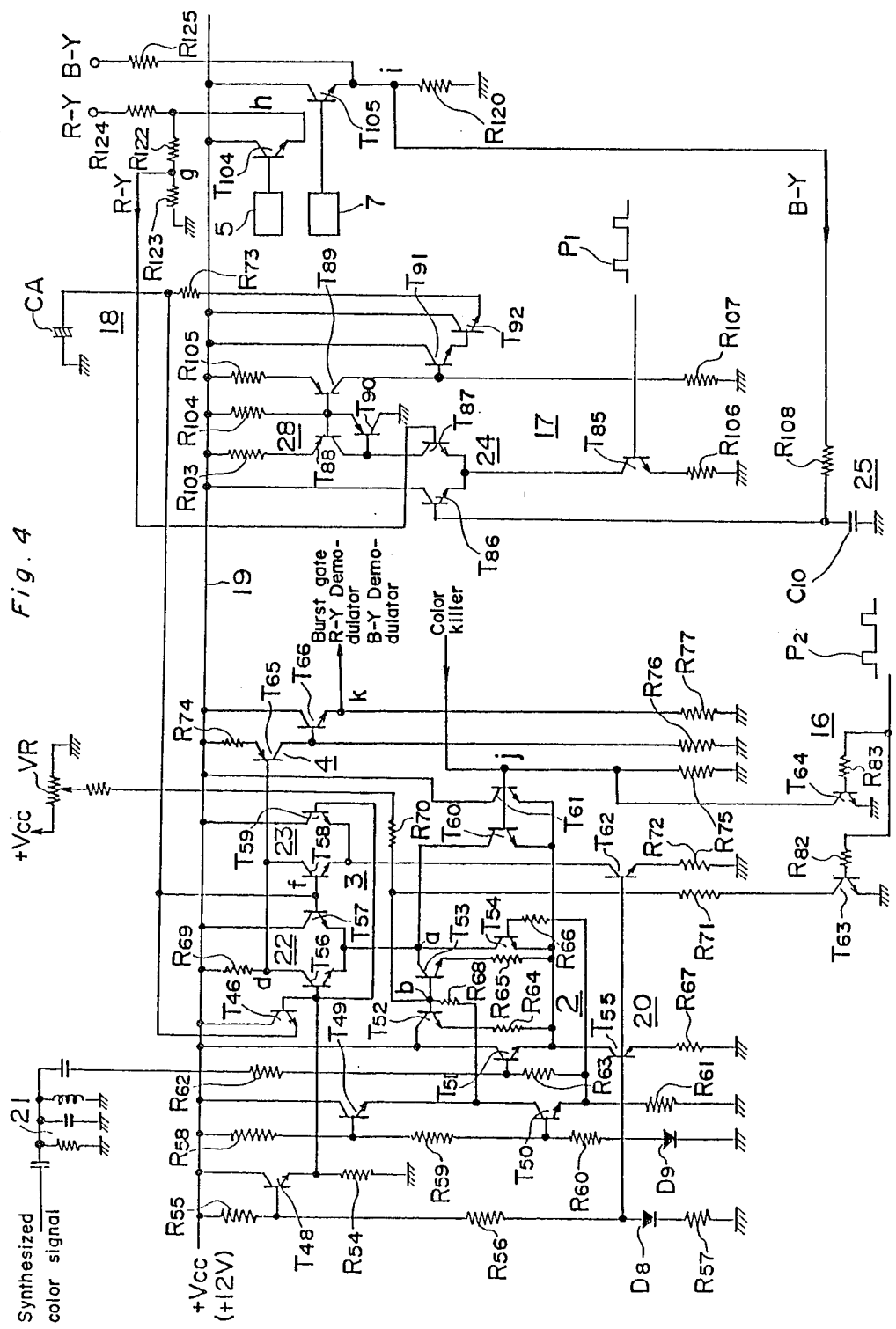
FIG. 4 is a circuit diagram showing the color gain control circuit according to one embodiment of the present invention together with its peripheral circuits.

Referring now to FIG. 4, the manual gain control 2 includes transistors T51, T52, T53 and T54, resistors R63, R64, R65, R66, R67, R68, R70 and the volume VR, whereas the automatic gain control 3 includes transistors T46, T56, T57, T58, T59 and T62, and resistors R69 and R72, the constant current source means 20 including a transistor T55 and a resistor R67.

Transistors T48, T49, and T50, diode D8 and D9, and resistors R54, R55, R56, R57, R58, R59, R60 and R61 constitutes a constant voltage circuit.

T65 represents a transistor forming the second color amplifier 4 the output from which is supplied to a point k through an emitter-follower transistor T66.

The synthesized color signal supplied through a bandpass circuit 21 is in turn supplied to the base of one T51 of two transistors forming a first differential pair through a resistor R62.

Figure 5:
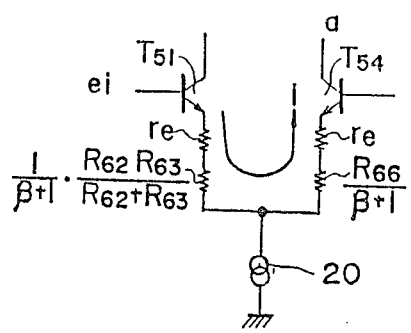
FIGS. 5 to 7 are explanatory diagrams for the explanation of the operation of the circuit of FIG. 4.

Assuming that the synthesized color signal supplied to the base of the transistor T51 and the signal current caused to flow by such synthesized color signal are respectively expressed by ei and i, the signal current i is attenuated across the resistors R64 and R65 (each being 2.2 KΩ) connected respectively to the emitters of the transistors T52 and T53 forming a second differential pair and will be scarcely supplied to these transistors T52 and T53. Therefore, as shown in FIG. 5, the signal current i appears at the point a from the emitter of the transistor T51 through an emitter-collector path of the other T54 of the transistors forming the first differential pair.

Assuming now that the current amplification factor of the transistor is $\beta$, the differential resistance re of the emitter is re=kT/ql (wherein k is a Boltzmann's constant, q is the potential of electrons and T is the absolute temperature) and the direct current flowing to the emitters of the first differential pair is Il, the signal current i can be given:

$$i = \frac{\frac{R63 \, ei}{R62 + R63}}{2\frac{kT}{qIl} + \frac{R66}{\beta + 1} + \frac{1}{\beta + 1} \cdot \frac{R62 R63}{R62 + R63}}$$

Since the base bias of the transistor T56 forming a part of the differential pair 22 of the automatic gain control 3 is selected to be higher than the base bias of the transistor T57 by the transistor T46, the differential pair 22 is such that the transistor T57 is switched off and the transistor T56 is switched on and, therefore, the signal current i flows to the transistor T56 and the signal current i' at the point d can be given:

$$i' = \left(\frac{\beta}{\beta + 1}\right)^2 \frac{\frac{R63 \, ei}{R62 + R63}}{2\frac{kT}{qIl} + \frac{R66}{\beta + 1} + \frac{1}{\beta + 1} \cdot \frac{R62 R63}{R62 + R63}}$$

Assuming that the output voltage resulting from this i' is expressed by eo, then, $$eo = R69 \cdot i' = \left(\frac{\beta}{\beta + 1}\right)^2 \frac{\frac{R63 R69 \, ei}{R62 + R63}}{2\frac{kT}{qIl} + \frac{R66}{\beta + 1} + \frac{1}{\beta + 1} \cdot \frac{R62 R63}{R62 + R63}}$$

The gain eo/ei is:

$$\frac{eo}{ei} = \left(\frac{\beta}{\beta + 1}\right)^2 \frac{\frac{R63 R69}{R62 + R63}}{2\frac{kT}{qIi} + \frac{R66}{\beta + 1} + \frac{1}{\beta + 1} \cdot \frac{R62 R63}{R62 + R63}}$$

and, by varying the direct current Ii, re=kT/qIi can be varied to vary the gain.

It is the differential pair of the transistors T52 and T53, the resistors R64, R65, R68 and R70 and the voltage VR that vary the direct current Ii.

When the base potentials of the transistors T52 and T53 are varied by the voltage VR to vary the potential difference between the emitter potential of the transistors T52 and T53 and the emitter potential of the transistors T51 and T54, thereby varying the direct current flowing through the resistors R64 and R65, the direct current Ii flowing through the transistors T51 and T54 changes in an amount corresponding to the amount of such variation and, therefore, the above described gain can be varied.

Since the manual gain control shown in FIG. 4 is so designed that the two differential pairs are connected to the same constant current source (transistor T55 and resistor R67) 20 with the resistors R64 and R65 being inserted between the constant current source 20 and the second differential pair T52 and T53, the output terminal of the second differential pair T52 and T53 being connected with the output terminal of the first differential pair T51 and T54 so that, by varying the bias of the second differential pair T52 and T53 to vary the direct current flowing through the first differential pair T51 and T54, the gain of the alternating current signal flowing through the first differential pair T51 and T54, the first and second differential pairs T51, T54 and T52, T53 can be maintained in a balanced condition with an improvement in temperature characteristic thereof.

Figure 8:
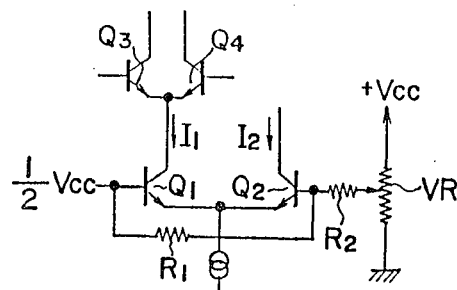
FIG. 8 is a circuit diagram of the conventional manual gain control.
Figure 9:
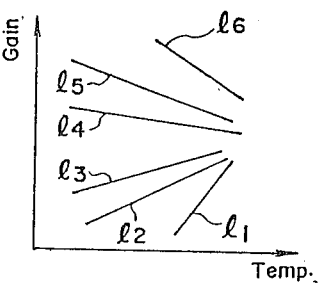
FIG. 9 is a graph showing the temperature characteristic of the gain of the manual gain control of FIG. 8.

In the conventional gain control shown in FIG. 8, since the differential pair $Q_1$ and $Q_2$ are in an unbalanced condition so that, by varying the ratio of division of the currents $I_1$ and $I_2$, the gain of a signal obtainable by the flow of the current $I_1$ can be varied, the characteristic relative to the temperature is such as shown in FIG. 9 and is not favorable. In FIG. 9, the axes of abscissas and ordinates show the temperature (° C.) and the gain, respectively, and there is such a disadvantage that, as the current division ratio departs from 1:1, the temperature drift becomes large such as shown by $l_1, l_2, l_3, l_4, l_5$ and $l_6$ with difficulty in compensation.

Figure 6:
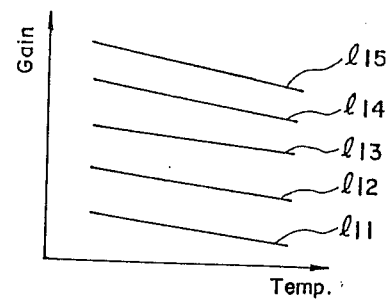

On the contrary thereto, in the circuit of the present invention, as shown in FIG. 6, the temperature characteristic is substantially constant at any state $l_{11}, l_{12}, l_{13}, l_{14}$ and $l_{15}$ (the state in which the direct current is varied by the voltage) and a slight change can be easily compensated for by, for example, giving a treatment to the constant current source 20. However, so far as the characteristic is such as shown in FIG. 6, the circuit can be practically utilized with no treatment required.

In addition, in the conventional circuit, since the control sensitivity of the voltage VR is determined by the ratio resistor $R_1$ and $R_2$ as shown in FIG. 8, the increase of the control sensitivity requires the increased ratio of the resistors $R_1$ and $R_2$. This means that, in an integrated circuit, the larger the resistance ratio, the greater the deviation in characteristic of the circuit, and this should be an undesirable occurrence.

On the contrary thereto, in the circuit of the present invention as shown in FIG. 4, the emitter potentials of the transistors T51 and T54 are of a respective value corresponding to the base potential of the transistors T52 and T53, i.e., the potential at the point b, which has been reduced in an amount equal to the amount of drop of the current resulting from the flow through the base-emitter paths of the transistors T52 and T53 and the associated resistors R64 and R65. Therefore, change in emitter potential of the transistors T51 and T54 relative to change in potential the point b is, since the base-emitter voltage of the transistors T52 and T53 is constant, reduced in an amount determined by the amount of voltage dropped across the resistors R64 and R65.

Accordingly, change in gain of the manual gain control 2 relative to change in potential at the point b becomes small and, therefore, in order for the voltage VR to give a necessary range of gain adjustment, it had better select the small ratio of the resistances of the resistors R68 and R70. As stated above to select the small ratio of the resistances of the resistors R68 and R70 is advantageous in fabricating the color gain control circuit in an integrated circuit.

In addition, since a gain control voltage is generally installed on a front side of the television receiver set, the line through which a controlled voltage obtained by the voltage is supplied to the required location is so long as to permit the inclusion of noises and external signals. However, in the circuit according to the above described embodiment of the present invention, there can be appreciated such a merit that such undesirable signals can hardly be introduced to the output side. It is to be noted that the resistors R64 and R65 may be constituted by a single resistor without being separately used.

The transistor T63 connected to the point b through a resistor R71 is switched on during the color burst signal period by a pulse P$_2$ fed to the base thereof through a resistor R82, thereby releasing the manually adjusted state, established by the setting of the voltage VR, during at least the color burst signal period. This is to release the manually adjusted state from the detecting operation of the ACC detector 17.

In FIG. 4, the differential pair 23 formed by the transistors T58 and T59 in the automatic gain control 3 serves to fix to a constant value the level of a direct current output appearing at the point d. On the other hand, although one T57 of the transistors T56 and T57 forming the differential pair 22 for amplifying signals is switched off as hereinbefore described, the base potential of the transistor T57 is determined by the voltage of a capacitor C$_A$ and, accordingly, the ACC voltage because, when the ACC signal is generated, the voltage across the capacitor C$_A$ increases to switch off the transistor T46. During the switching-on of the transistor T57 due to the ACC voltage, the direct current flowing through the transistor T57 is controlled by the ACC voltage and, accordingly, the direct current through the transistor T56 forming the differential pair of this varies whereby the gain of the synthesized color signal appearing at the point d can automatically be controlled by the ACC voltage.

The ACC detector 17 for synthesizing the ACC signal (voltage) to be supplied to the point f is, as shown in FIG. 4, comprised of a comparator 24 including differentially connected transistors T86 and T87 and a constant current source formed by a transistor T85 and a resistor R106, which comparator 24 is operable to compare the amplitude of an R-Y demodulated output, applied from the R-Y demodulator 5 to the base of the transistor T87 through an emitter-follower T104 and the junction g between breeder resistors R122 and R123, with the amplitude of a B-Y demodulated output applied from the B-Y demodulator 7 to the base of the transistor T86 through an emitter-follower T105 and the low pass filter 25 (formed by a resistor R108 and a capacitor C10).

However, it is to be noted that, since the comparator 24 is operable only during the period of the burst gating pulse P1 to be supplied to the constant current source transistor T85, only a portion of each of the demodulated outputs which falls within the color burst signal period is utilized for comparison.

Assuming that the respective voltages of the R-Y and B-Y outputs appearing at the points h and i are expressed by E$_R$, E$_B$ and the base potentials of the transistors T86 and T87 are respectively expressed by V86 and V87, $$V86 = E_B$$

$$V87 = \frac{R123}{R122 + R123} E_R$$

since the R-Y and B-Y demodulators 5 and 7 are so designed as to establish the relationship of E$_R$=E$_B$, the difference ΔV1 in base potential between the transistors T86 and T87 is given by the following equation.

$$\Delta V1 = \frac{R122}{R122 + R123} E_B$$

Figure 7:
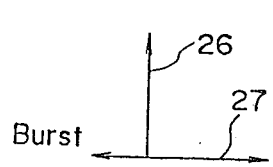

The phase relationship among the demodulation axis 26 of the R-Y demodulator 5, the demodulation axis 27 of the B-Y demodulator 7 and the color burst signal is such as shown in FIG. 7. Although the B-Y demodulation axis 27 is generated having a negative polarity since it is opposite in phase to the color burst signal, the B-Y demodulated output to be compared varies according to the magnitude of the color burst signal and the switching on and off the transistors T86 and T87 are reversed on the boundary of ΔV1. It is to be noted that the color burst demodulated output from the R-Y demodulator 5 is zero judged from the phase relationship of FIG. 7, and only a direct current bias is applied to the transistor T87. When the color burst demodulated output from the B-Y demodulator 7 is smaller than ΔV1, the base potential of the transistor T86 is still higher than the base potential of the transistor T87 and, therefore, the transistors T86 and T87 are switched on and off, respectively. Accordingly, no current flows through the current Miller circuit formed by transistors T88, T89 and T90 and resistors R103, R104 and R105 and, therefore, no charging current flows to the capacitor C$_A$ forming the low pass filter 18 together with the resistor R73. Because of this, the potential at the point f will not cause the transistors T57 and T58 to conduct.

On the contrary thereto, when the demodulated output of the color burst signal from the B-Y demodulator 7 increases with the base potential of the transistor T86 becoming lower than that of the transistor T87, the transistors T86 and T87 are switched off and on, respectively, with a current flowing through the current Miller circuit 28, resulting in that the capacitor C$_A$ is charged through the Darlington connection circuit formed by transistors T91 and T92 with the voltage thereacross so increased as to bring the transistors T57 and T58 of the automatic gain control 3 into conductive state. Especially, the conduction of the transistor T57 results in that the current division ratio of the transistors T56 and T57 is controlled by the ACC voltage appearing across the capacitor $C_A$ therefore, the gain of the output appearing at the point d through the emitter-collector path of the transistor T56 can be automatically controlled so as to be reduced.

Although in the foregoing description the detection of the ACC signal is carried out, not only the utilization of only the output from the B-Y demodulator 7, but by the amplitude comparison of the output from the B-Y demodulator 7 with the output from the R-Y demodulator 5, this technique is advantageous in avoiding any possible erroneous operation which would result from noises. In other words, the noises are many when in a weak electrical field and tend to be supplied from the demodulator to the ACC detector 17. Therefore, if the ACC signal is synthesized by the use of only the output from the B-Y demodulator 5, the B-Y demodulated output would be so drifted that, even when the amplitude of the color burst signal is low, such an erroneous operation will occur that ACC works to reduce the gain of the automatic gain control 3. However, if the amplitude comparison is carried out subject to the outputs from the B-Y and R-Y demodulators 7 and 5, respectively, such as in the embodiment of FIG. 4, the noises are supplied to the comparator 24 from both of the demodulators 5 and 7 and are conterbalanced to each other without being superimposed on the ACC signal. Therefore, no erroneous operation such as described above occurs. It is to be noted that the output from a G-Y demodulator 6 may be utilized in place of the output from the R-Y demodulator 5, because the color burst demodulated outputs from the R-Y and G-Y demodulators 5 and 6 are substantially the same. Specifically, the color burst demodulated output from the R-Y demodulator 5 is zero, whereas the color burst demodulated output from the G-Y demodulator 6 can be considered substantially zero because the G-Y demodulator 6 can be obtained by matrix-processing the outputs from the R-Y and B-Y demodulators 5 and 7 and is, set to a value generally 3/10 of the outputs from the R-Y and B-Y demodulators 5 and 7 and, therefore, generates its output after the outputs from the B-Y demodulator 7 has been reduced to a value of 3/10.

In FIG. 4, transistors T60 and T61 are transistors operated by a color killer signal and are connected as shown in FIG. 4 so that, when the output from the color killer 15 supplied to the point j is in a low level, the transistors T60 and T61 are switched off and, therefore, do not participate in the operation of the transistors T51, T52, T53 and T54 of the manual gain control 2. However, when the output from the color killer 15 supplied to the point j is in a high level, these transistors T60 and T61 are switched on to increase their emitter potentials so that the transistors T51 and T54 can be switched off without the signal at the base of the transistor T51 being supplied to the collector of the transistor T54 and, hence, the point a. In this manner, the color killer is carried out. However, when the manual gain control 2 is totally stopped, no color burst signal is supplied to the phase comparator 12 (See FIG. 3) in the automatic color synchronizing circuit and, accordingly, no color synchronization is effected. In order to avoid this disadvantage, the killer disabling means 16 is for disabling the color killer signal during at least the color burst period to allow the manual gain control 2 to operate, which killer disabling means 16 is, as shown in FIG. 4, constituted by a transistor T64. This transistor T64 is, in response to a pulse P2 applied to the base thereof through a resistor R83, switched on during the duration of such pulse P2 (which includes the color burst signal period and is longer than the color burst signal period) to clamp the potential at the point j to an earth level. Accordingly, even when a high level output is supplied to the color killer to the point j, the transistors T60 and T61 are held in non-conductive state during the duration of the pulse P2 and, therefore, the manual gain control 2 is operable.

Although the basic embodiment of the present invention has been set forth in the foregoing description, the present invention should not be limited thereto, but can be constructed in various ways within the scope of the claim.

I claim:

1. A color gain control circuit characterized in that a manual gain control, the bias of which is controllable by a manipulatable voltage, and an automatic gain control, the bias of which is automatically controllable by an ACC signal, are connected in cascade between a power source and a constant current source with the automatic gain control positioned upstream of the manual gain control with respect to the power source.

2. A color gain control circuit as defined in claim 1, characterized in that said manual gain control comprises a first differential pair of differentially connected transistors and a second differential pair of differentially connected transistors both connected to the constant current source, wherein resistor means are inserted between the second differential pair and the constant current source, and the respective output terminals of each of said first and second differential pairs are connected to each other.

3. A color gain control circuit as defined in claim 1 or 2, characterized in that the ACC signal for said automatic gain control is obtained from a comparator for comparing the amplitudes of respective outputs from B-Y and R-Y or G-Y demodulators.

4. A color gain control circuit as defined in any one of claims 1 or 2, characterized in that, in a color television receiver set of a type having a color killer system for stopping the manual gain control to avoid the appearance of color noises on a picture screen when the color synchronization is out of order during the receipt of a color television broadcasting, a color killer signal is disabled during at least the color burst period to allow the manual gain control to be operable.

* * * * *